(12) United States Patent  
Kapinos et al.

(10) Patent No.: US 12,107,812 B2
(45) Date of Patent: Oct. 1, 2024

(54) MOVEMENT OF CONTENT FROM FIRST AND SECOND ELECTRONIC MESSAGES INTO THIRD ELECTRONIC MESSAGE

(71) Applicant: Lenovo (Singapore) Pte. Ltd., Singapore (SG)

(72) Inventors: Robert J. Kapinos, Durham, NC (US); Scott Li, Cary, NC (US); Robert James Norton, Jr., Raleigh, NC (US); Russell Speight VanBlon, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 179 days.

(21) Appl. No.: 17/707,179

(22) Filed: Mar. 29, 2022

(65) Prior Publication Data

US 2023/0319002 A1  Oct. 5, 2023

(51) Int. Cl.
*G06F 15/16* (2006.01)
*H04L 51/21* (2022.01)
*H04L 51/214* (2022.01)
*H04L 51/216* (2022.01)
*H04L 51/56* (2022.01)
*G06Q 10/107* (2023.01)
*H04L 51/00* (2022.01)
*H04L 51/212* (2022.01)

(52) U.S. Cl.
CPC .......... *H04L 51/214* (2022.05); *H04L 51/21* (2022.05); *H04L 51/216* (2022.05); *H04L 51/56* (2022.05); *G06Q 10/107* (2013.01); *H04L 51/00* (2013.01); *H04L 51/212* (2022.05)

(58) Field of Classification Search
CPC ..... H04L 51/21; H04L 51/212; H04L 51/214; H04L 51/216; H04L 51/56; G06Q 10/107
USPC ........................................................ 709/206
See application file for complete search history.

(56) References Cited

U.S. PATENT DOCUMENTS

| | | | |
|---|---|---|---|
| 7,831,676 B1* | 11/2010 | Nagar | G06Q 10/107 709/224 |
| 11,316,818 B1* | 4/2022 | Nagar | H04L 51/063 |
| 2003/0110227 A1* | 6/2003 | O'Hagan | G06Q 10/107 709/206 |
| 2006/0031324 A1* | 2/2006 | Chen | H04L 51/216 709/206 |
| 2008/0168173 A1* | 7/2008 | Munje | G06Q 10/107 709/228 |
| 2009/0150498 A1* | 6/2009 | Branda | G06Q 10/107 709/206 |
| 2009/0177745 A1* | 7/2009 | Davis | G06Q 10/107 709/204 |
| 2009/0177754 A1* | 7/2009 | Brezina | H04L 67/306 709/206 |

(Continued)

*Primary Examiner* — Imad Hussain
(74) *Attorney, Agent, or Firm* — John M. Rogitz; John L. Rogitz

(57) ABSTRACT

In one aspect, a device may include at least one processor and storage accessible to the at least one processor. The storage may include instructions executable by the at least one processor to identify a first email, identify a second email different from the first email, determine that the first and second emails are related, and move content from at least one of the first and second emails into a third email responsive to the determination. Present principles may also apply to other electronic message types besides emails.

20 Claims, 5 Drawing Sheets

(56) References Cited

U.S. PATENT DOCUMENTS

| | | | |
|---|---|---|---|
| 2016/0014053 A1* | 1/2016 | Celia | G06F 3/04842 |
| | | | 715/752 |
| 2016/0380958 A1* | 12/2016 | Silverman | H04L 51/216 |
| | | | 709/206 |
| 2020/0120056 A1* | 4/2020 | Roth | H04L 51/216 |

* cited by examiner

MOVEMENT OF CONTENT FROM FIRST AND SECOND ELECTRONIC MESSAGES INTO THIRD ELECTRONIC MESSAGE

FIELD

The disclosure below relates to technically inventive, non-routine solutions that are necessarily rooted in computer technology and that produce concrete technical improvements. In particular, the disclosure below relates to movement of content from first and second electronic messages into a third electronic message.

BACKGROUND

As recognized herein, technology is becoming more and more ubiquitous in society. As such, the number of electronic notifications and messages people receive is increasing exponentially. As also recognized herein, this makes managing such a high volume of electronic messages extremely difficult if not impossible. Not only can this lead to missed electronic messages and dropped tasks, but this can also consume an unnecessary amount of electronic storage space and involve dedicating an unnecessary amount of digital protection and security to managing such a high volume of electronic messages. There are currently no adequate solutions to the foregoing computer-related, technological problems.

SUMMARY

Accordingly, in one aspect a device includes at least one processor and storage accessible to the at least one processor. The storage includes instructions executable by the at least one processor to identify a first email, identify a second email different from the first email, determine that the first and second emails are related, and move content from at least one of the first and second emails into a third email responsive to the determination.

Thus, in certain examples the third email may be the second email, and the instructions may be executable to move content from the first email into the second email. If desired, responsive to moving content from the first email into the second email, the instructions may also be executable to remove the first email from an inbox and/or delete the first email from an email account to which the first email was sent.

Also in certain examples, the third email may be different from the first and second emails. The third email may be a reply to one of the first and second emails and/or an email draft that has not been sent yet.

Still further, in some example implementations the instructions may be executable to determine that the first and second emails are related based on at least some of the same content being included in both the first and second emails. The same content may relate to one or more past emails that are different from the first, second, and third emails, and/or the same content may include a same subject line. Additionally, if desired the instructions may be executable to determine that the first and second emails are related based on at least one sender and/or recipient being common to the first and second emails.

In another aspect, a method includes identifying a first electronic message, identifying a second electronic message different from the first electronic message, determining that the first and second electronic messages are related, and moving content from at least one of the first and second electronic messages into a third electronic message responsive to the determining.

In certain example implementations, the electronic messages may be emails, text messages, social media messages, and/or online portal messages.

Also in certain example implementations, the method may include, responsive to the determining, moving content from both of the first and second electronic messages into the third electronic message so that content of the first and second electronic messages is arranged in the third electronic message in reverse-chronological order from top to bottom based on respective times at which the first and second electronic messages were sent and/or received.

If desired, the determining may be performed at least in part based on a rules-based algorithm executing at a device. Additionally or alternatively, the determining may be performed at least in part based on output from one or more artificial neural networks that have been trained for making inferences about whether two messages are related.

In still another aspect, at least one computer readable storage medium (CRSM) that is not a transitory signal includes instructions executable by at least one processor to identify a first electronic message, identify a second electronic message different from the first electronic message, determine that the first and second electronic messages are related, and move content from at least one of the first and second electronic messages into a third electronic message based on the determination.

In some example embodiments the instructions may also be executable to identify a fourth electronic message. The first, second, and fourth electronic messages may have a same subject line. In these embodiments, the instructions may also be executable to decline to include content from the fourth electronic message in the third electronic message based on content of the fourth electronic message.

Also in certain example embodiments, the instructions may be executable to determine that the first and second electronic messages are related based on execution of contextual analysis.

Still further, if desired the instructions may be executable to present a prompt on a display based on the determination, where the prompt may ask if content from the first and second electronic messages should be moved into the third electronic message. Responsive to user input responding in the affirmative to the prompt, the instructions may be executable to move content from both of the first and second electronic messages into the third electronic message.

The details of present principles, both as to their structure and operation, can best be understood in reference to the accompanying drawings, in which like reference numerals refer to like parts, and in which:

DETAILED DESCRIPTION

Figure 1:
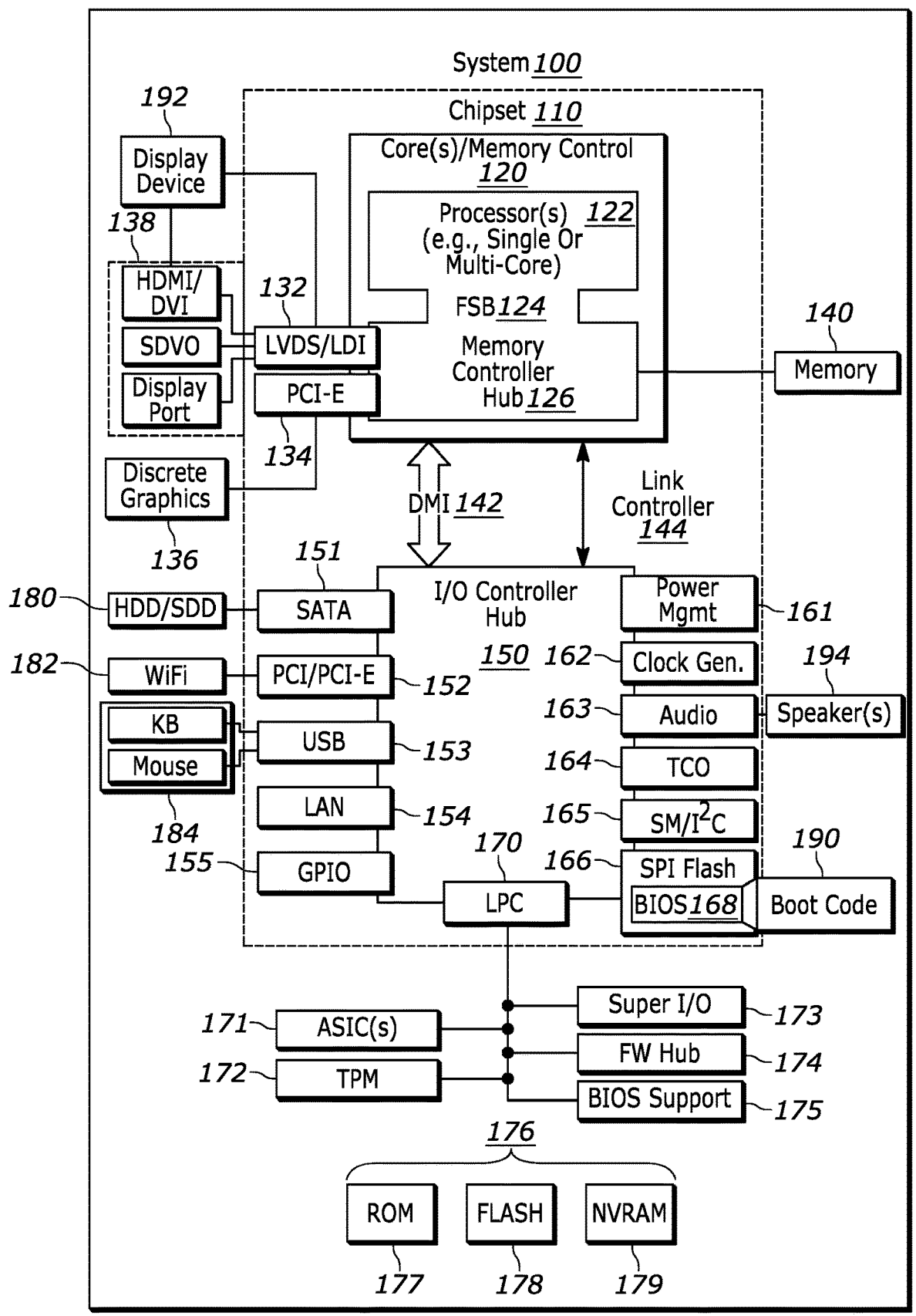
FIG. 1 is a block diagram of an example system consistent with present principles.

Among other things, the detailed description below provides for autonomous management and merging of parallel electronic message threads.

For example, upon a person replying "reply" to a thread, the content and recipient list may be analyzed. This may be done both discretely by rules and/or in a learning mode to handle repeating threads within a group of people.

The rules may be used to handle autonomous thread merges based on title and recipient, among other things. Thus, if a reply is made to the same body of individuals as other sent messages and the title of the messages is the same, the e-mail system or other messaging system may merge all parallel messages into one, with the message bodies arranged in chronological order (or reverse-chronological order, depending on the desired view). If a new email come in later, intermediately-received emails are added to the new email as downthread bodies in the view order rather than added to an inbox as a new and discrete email. Thus, only one email may be presented to the user and present/maintained in the user's email service inbox, even if multiple emails in the thread would otherwise be marked as unread and presented separately in the inbox, so that the user may instead view all unread messages via scrolling a single email that has had content from other related emails added into it.

For example, suppose a user named Rob sends Email A to a large body of recipients. John, Jane, and Ted reply back in that order to the whole body of senders/recipients. Everyone gets John's email first, unmodified except for including the message body of Email A itself. When Jane's reply comes in, the email system adds John's reply into Jane's email between Rob's Email A (lowest in the body of Jane's email) and Jane's reply (top of the body of Jane's email) so that John's reply is lower down in Jane's email than the text itself of Jane's reply as drafted by Jane herself, and the system also removes John's original reply email from each individual user's inbox. Thus, the emails from Rob and John may be combined into a single email—Jane's email—even if John replied directly to Rob's Email A rather than to Jane's reply itself.

Then when Ted's email arrives, John and Jane's replies may be added to Ted's email in between Rob's Email A (lowest) and Ted's reply (top) and the system may remove Jane's email from each sender/recipient's inbox (even if it has gone unread) since Jane's email has now been incorporated into Ted's email. Similarly, if anyone replies to John or Jane's email before Ted sends his message, those other replies may be added into Ted's email in chronological order of send (as appearing in each person's inbox). Note here that all attachments attached to these various emails may also be added to the most-recent email, which is Ted's email in this example. Thus, e.g., a first attachment like an image or PDF document that John added to his email and a second attachment like a slide presentation that Jane added to her own email may be downloaded, stored, and then added by the system as attachments to Ted's email for presentation in everyone's respective inboxes even if Ted himself did not include any attachments when initially sending his email.

Also note if Rob then begins replying back to Ted's email, but another email is received while Rob is still drafting his own email, the other email that is received may have its content added to the GUI of the message draft Rob is still drafting, immediately below Rob's own message that is being drafted and above other messages sent earlier in time so that once Rob sends the email, the other emails that were received have already been added to it.

Contextual analysis may also be executed on the body of messages that are received by one person/messaging account to determine whether several groups are talking about the same topic under different message subjects/titles. If the original message bodies are determined to be similar to within a threshold level of confidence, the e-mail client or other messaging client may offer/prompt to merge the threads. After the user accepts, multiple threads may be combined in the same way as described above according to rules-based analysis. After the combine action, the address lists for replies may also be merged on additional replies so that each sender or recipient of a given message is included on the additional replies. Also note that in some examples, replies from the original address lists for both threads may be treated as if they were to the whole thread. However, further note that if the user does not accept to merge the threads upon being prompted, the messages may still be managed/maintained separately.

As for the aforementioned learning mode, it may involve three or more components in certain example embodiments. First, informal user groups may be identified and remembered by sender/recipient lists and user actions. If the user repeatedly breaks off a single recipient or group of recipients repeatedly for a reply to an initial email that had additional people listed as recipients (and/or if the user switches email addresses used to send the reply), responses from the subset of individuals on same topic may be treated first as "ask before merging" groups for which confirmation prompts may be presented when those people reply. Then eventually after a threshold number of times that the user responds negatively to the prompts the system may disallow merging, instituting "do not merge" recipients and no longer combining the content of various messages that might otherwise be related. However, another combined email thread may still be started for the thread between the single recipient/subset of recipients and sender so that, for example, if the senders and recipients in a given email chain all have a same email domain name in their respective email addresses, those emails may be combined into one email while other emails having the same subject line but from an email address with a different domain name may still be presented separately. Thus, note here that domain names may be used not just for the learning mode but also for a rules-based algorithm where, e.g., only emails having the same email address domain name are merged together while others are not, even if the emails otherwise have the same context, subject line, etc. that would result in merging.

Also note that after a threshold number of affirmative and possibly consecutive responses to the prompts (e.g., at least ten), the system may deem that it has been sufficiently trained and stop prompting the user and instead just autonomously merge future messages without prompting (while still allowing the user to un-merge at will). This may be done globally regardless of individual rules, or may be done on a per-rule basis so that the system prompts until it reaches the threshold number for each rule being applied in a given instance.

Second, when the user accepts or denies contextual thread merges over time (e.g., via prompts as described herein), the system may learn which kinds of contextual messages to merge and which to not merge as already referenced above. This manages whole-group spam from responders who may be sending back only "OK" or "Out of Office". Various machine learning techniques may be used to do this.

Third, the learning mode algorithm can learn through repetition the difference between unactionable replies and business as usual back communication. For example, every week, a status meeting might have one person that sends each week their list of items to address during the meeting. This weekly email may be set to always be included on the weekly email thread and so may be added to other messages or have other messages added to it. But if the same person, on a single day, sends a joking reply in that thread that is identified as such by the system, since this is an unusual reply to the thread topic the system may flag it to prompt the user on whether to merge before actually merging.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone. The system 100 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
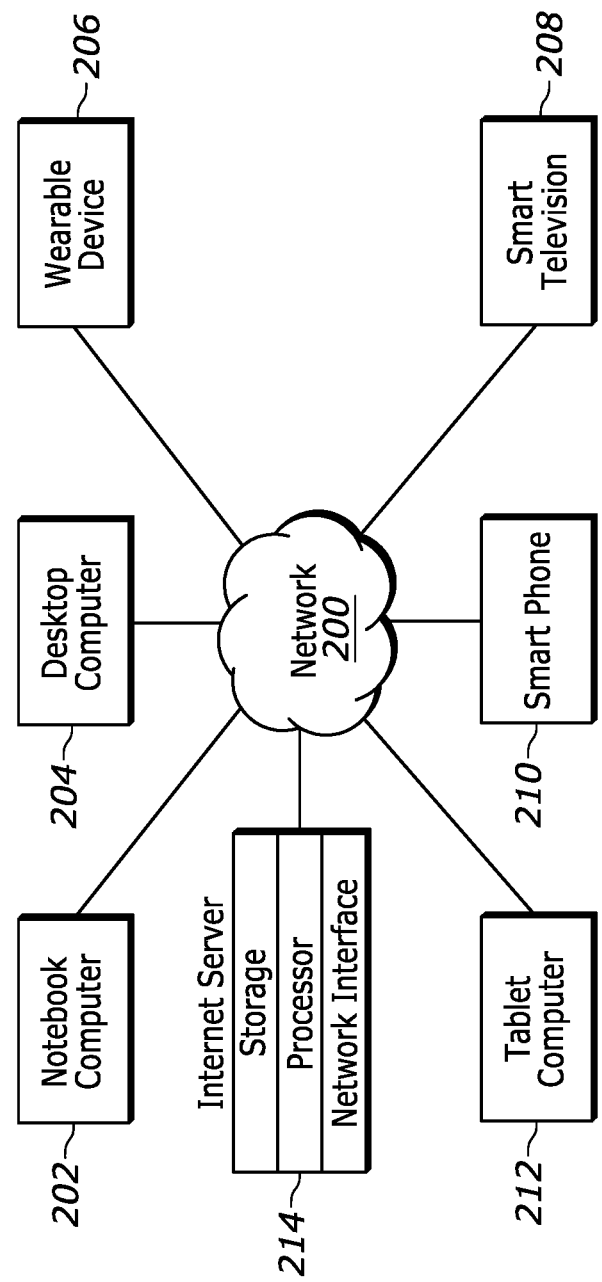
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
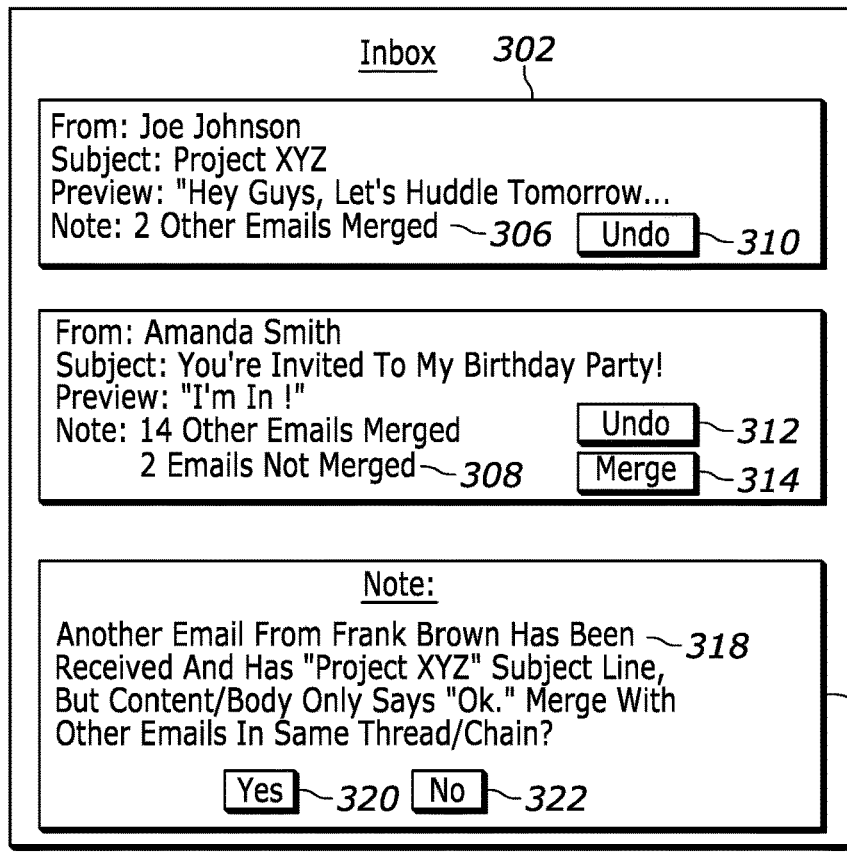
FIG. 3 illustrates an example email inbox along with a prompt that may be presented consistent with present principles.

Turning now to FIG. 3, an example graphical user interface (GUI) 300 is shown that includes an email/message inbox. Two different emails/previews 302, 304 are represented on the GUI 300, with each one being selectable to present the respective email itself. Thus, it is to be understood that if one of the emails 302, 304 is selected from the inbox GUI 300, the associated email including the message body and attachments for download may be presented as will be described later in reference to FIG. 4.

But as may still be appreciated from FIG. 3, each email/preview 302, 304 as indicated on the inbox GUI 300 may include certain data about the associated email, including whom sent the email (the "from" field), the subject or title of the email (the subject line field), and a preview of some of the beginning text of the body of the associated email itself.

Consistent with present principles and as also shown in FIG. 3, each email 302, 304 as indicated in the inbox GUI 300 may also include a respective notification 306, 308. Example notification 306 indicates that two other emails also received at the same inbox have had their content merged, moved, and/or combined into the email 302. Note here that merging, moving, and/or combining of the content may involve combining the content of each respective email (including any email attachments) into a single email that may be presented (rather than simply grouping discrete emails together in the inbox). Thus, in certain specific implementations, combining the content of plural emails into a single email may involve comparing the content of different emails identified as related and then taking only the new and/or different content from each respective email that is compared and placing that new/different content into the single email in reverse-chronological order for presentation to the user. Thus, multiple emails may be combined into one but without duplicate entries/content.

As also shown in FIG. 3, the notification 306 may be accompanied by a selector 310 that may be selectable by an end-user using touch input, cursor input, etc. to command the device or email system (e.g., executing remotely at an email server) to un-merge the two other emails that were combined into the single email 302. Thus, responsive to selection of the selector 310, the device or system may remove the relevant content from the email 302 (in its current form) that was merged from one or both of the two other emails indicated via notification 306 and instead present those other emails separately in the inbox 300 and/or as a group of emails (rather than a single email with combined content from other emails).

FIG. 3 further shows that example notification 308 indicates that fourteen other emails also received at the same inbox have had their content merged, moved, and/or combined into the email 304. The notification 308 also indicates that two other emails that might have been related have nonetheless not been merged. The other two emails may have not been merged because of a different number/names of recipients of the two other emails, the two other emails being inconsequential emails, the two other emails being mere acknowledgements of past emails, the two other emails being off-topic of the associated subject line itself ("You're invited to my birthday party!"), the two other emails being automated away responses such as automated out of office replies, etc.

As further shown in FIG. 3, the notification 308 may be accompanied by a selector 312 that may be selectable by an end-user to un-merge the fourteen other emails. Accordingly, responsive to selection of the selector 312, the device or system may remove the content from the email 304 in its current form that was merged from the fourteen other emails (as indicated via notification 308) and instead present those other fourteen emails separately in the inbox 300 and/or as a group of emails (again rather than a single email with combined content from other emails). Additionally, notification 308 may be accompanied by a selector 314 that may be selectable to in fact merge or combine into a single email the content of the other two messages for which the device/system did not autonomously merge the associated content already.

Note here that also in some example embodiments, the device/system may use the selection of one or more of the selectors 310-314 to perform additional training of an artificial intelligence (AI) model deployed consistent with present principles, as will be described further below.

But still in reference to FIG. 3, in some examples the device or system may further present a pop-up or overlay prompt 316 on the inbox GUI 300, though the prompt 316 may be presented separately as well such as responsive to a different email than the one that is the subject of the prompt 316 (the email from Frank Brown) being opened but that the device/system determines is still potentially related. For example, the prompt 316 may be presented responsive to the email 302 itself being opened from the GUI 300.

In any case, as shown the prompt 316 may include an indication 318 that that an email from Frank Brown has been received and has the same subject line ("Project XYZ") as the email 302, but the content or body of the email itself only indicates an "ok" acknowledgment. The prompt 316 may also ask the user if the content of this email from Frank Brown should be merged with the content of other emails of the same message thread/chain (e.g., having the same subject line) that have already been merged in reverse-chronological order into a single email represented by email 302 (which may include and be formed by a most-recently sent/received email in the chain itself as a base for holding the rest of the email chain in a single email). Accordingly, the end-user may select the yes selector 320 to respond affirmatively (merge) or select the no selector 322 to respond negatively (do not merge). But regardless of which selector 320, 322 is selected, also note that in some examples the user's response via the selector 320 or 322 may be used for additional training of an AI model as described further below.

Figure 4:
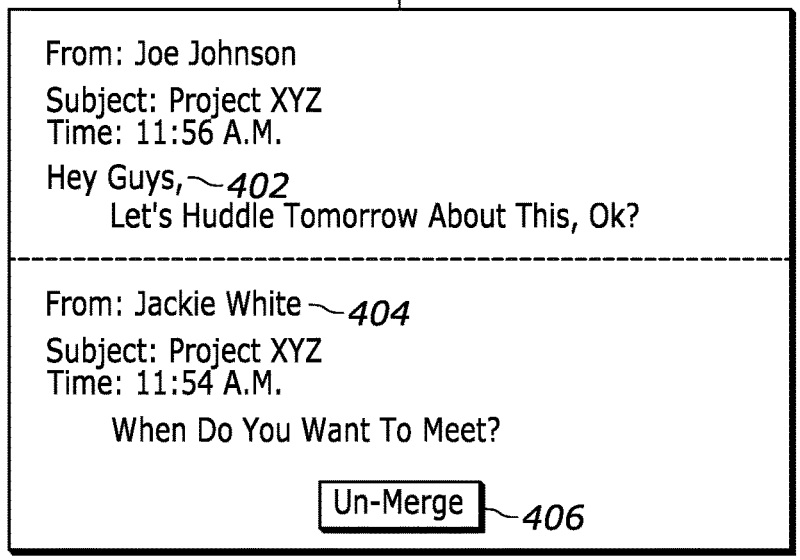
FIG. 4 illustrates an example email into which content from other emails has been moved consistent with present principles.

Continuing the detailed description in reference to FIG. 4, another example GUI 400 is shown. Here the GUI 400 includes the email 302 that was previewed via the GUI 300. As shown in FIG. 4, the email 302 indicates its sender, subject, and the time at which the email 302 was received. The email 302 as presented on the GUI 400 also includes a message body 402 which may include text as shown.

FIG. 4 also shows that, as part of the email 302, beneath the message body 402 for the message from Joe Johnson, additional message body 404 for one or more past emails determined by the system to be related to Joe Johnson's email may also be presented. Note here that the additional message body 404 may include the content of one or more additional emails that were merged into the email 302, even if replies established by those other emails were received out of order, did not respond to a most-recently sent email from a member of the group on the email 302, etc.

Accordingly, for each respective additional email for which its content was merged into the email 302 as part of the additional message body 404, a selector 406 may be presented for the user to select to command the device/system to un-merge the associated underlying email content from the email 302 and to present it separately to the user via the user's inbox as a separate email (or group it with the email 302 but not with its new or different content merged into the email 302 itself). Thus, in the present example, selection of the selector 406 may command the device/system to unmerge an email from Jackie White that had the same subject line as Joe Johnson's email.

Figure 5:
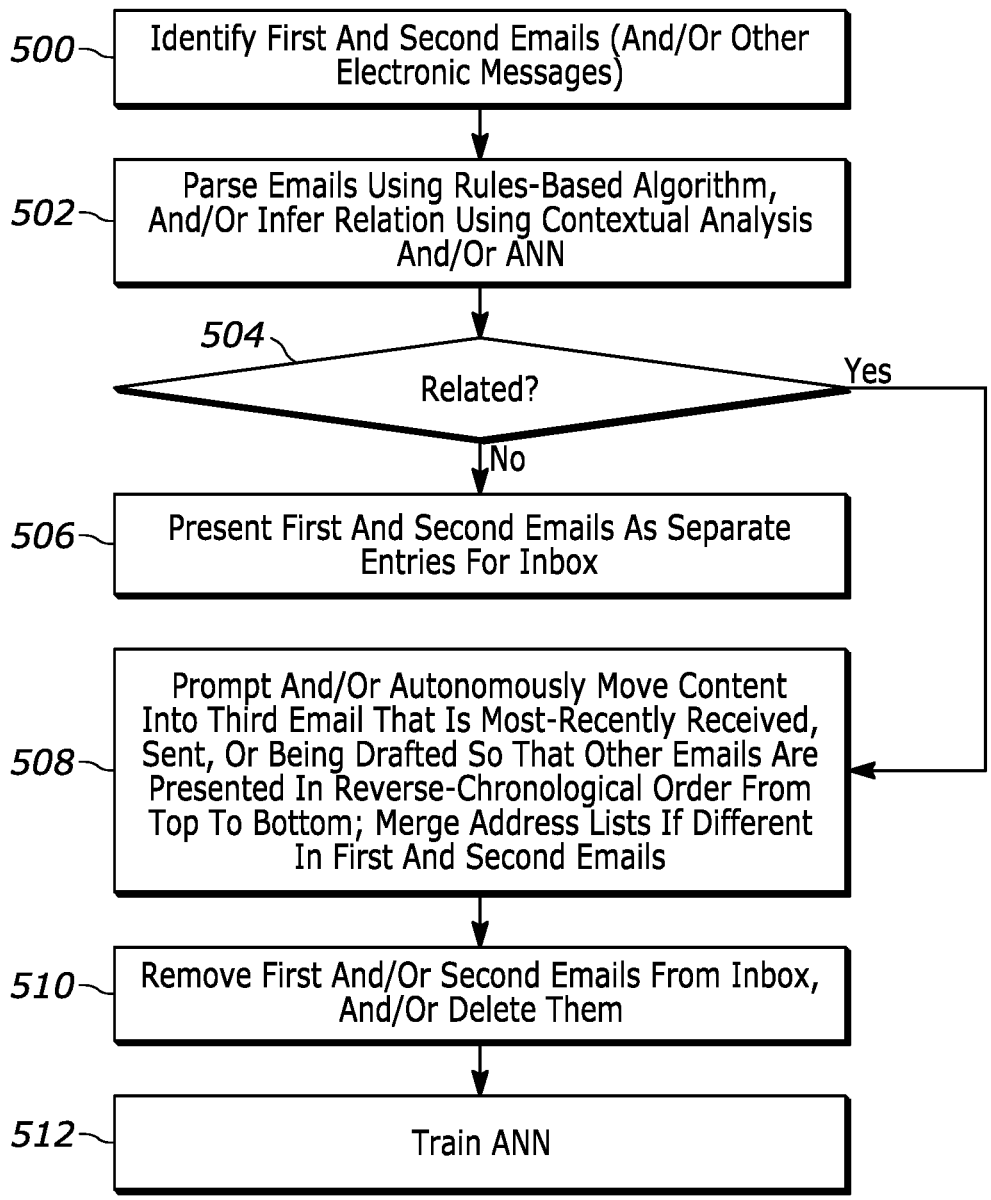
FIG. 5 shows example logic in example flow chart format that may be executed by a device consistent with present principles.

Referring now to FIG. 5, it shows example logic that may be executed by a device such as the system 100, a client device, and/or a message server in any appropriate combination consistent with present principles. Note that while the logic of FIG. 5 is shown in flow chart format, other suitable logic may also be used.

Beginning at block 500, the device may identify first and second emails and/or electronic messages of other message types. For example, in addition to or in lieu of merging emails into a single message, short message service (SMS) text messages, social media messages, online portal messages, etc. may also be merged with other messages that are identified as related, whether of the same message type or not. So, for example, in certain examples emails and SMS text messages having a same subject or being identified as related may be merged into a single email presented in an inbox to a user.

But regardless of the type of electronic messages identified at block 500, from block 500 the logic may then proceed to block 502. At block 502 the device may parse the emails (or other message types) using a rules-based algorithm to determine whether the first and second emails are related. This may include determining that at least some of the same content is included in both of the first and second emails, such as a same additional (prior) email that was included farther down in the respective message body of each of the first and second emails (e.g., in a past messages section). Accordingly, in some specific examples, this may include determining that both of the first and second emails are replies or subsequent follow-up messages to an initial message starting the message chain and reflected in both of the first and second emails.

The rules-based algorithm may also be configured to determine that the first and second emails are related based on at least one sender being common to the first and second emails and/or at least one recipient being common to the first and second emails. As yet another example, the rules-based algorithm may be configured to determine that the first and second emails are related based on a same subject line for both of the first and second emails. Contextual analysis software may also be executed, including for example topic segmentation/understanding, to determine or infer whether the contexts of the first and second emails are related or the same (e.g., even if the respective subject lines are different).

Also at block 502, in addition to or in lieu of the foregoing the device may determine whether the first and second emails are related by inferring relation using one or more artificial neural networks (ANNs) that have been trained for making such inferences about whether two messages are related. Accordingly, for the ANN, a Ripper model or a Bayesian network model such as a naive Bayesian model may be adopted for further training, as may be other models including feed-forward neural networks, recurrent or convolutional neural networks, and pattern recognition and natural language processing (NLP) models in particular. Representation learning and deep machine learning methods may then be used later (such as at block 512) to train the model to make improved inferences about whether electronic messages are related (e.g., based on related context, related subject, same recipients, etc.).

From block 502 the logic may then proceed to decision diamond 504. At diamond 504 the device may, if it has not already done so, determine whether the first and second emails are in fact related. A negative determination may cause the logic to proceed to block 506 where the device may present the first and second emails (or other messages) as separate entries in an inbox or other message box.

However, responsive to an affirmative determination at diamond 504, the logic may proceed to block 508. At block 508 the device may present a prompt (such as the prompt 316) and/or autonomously move content from the first and/or second emails into a third email for presentation in reverse-chronological order from top to bottom based on respective times at which the first and second emails were sent and/or received. The third email itself may be a most-recently received, sent, or drafted email from among all emails or other messages determined to be related.

As such, in some examples the third email may be one of the first and second emails, where one of those two emails has its content moved into the other email (with no duplicate entries). Or the third email may be different from the first and second emails, and in that case new or different contents indicated only in the first or second email may be moved into the third email (with the third email therefore containing no duplicate entries for the same content that might have been found in/moved from other emails into the third email). For example, the third email may be a reply to one of the first and second emails, whether that reply has already been sent or is still an email draft that has not been sent yet.

Also note that in some examples, at block 508 the device may merge the sender(s) and recipient(s) of the first email and the sender(s) and recipient(s) of the second email together so that the senders and recipients of each one are all included as addresses for the third email, either as a recipient to the third email or as a sender of the third email as appropriate. This may happen even if none, or only some but not all, senders/recipients are the same between the first and second emails. So if an end-user were to reply all to the third email, that reply email would be addressed to all of the other people listed as senders/recipients on the first and second emails. Thus, it is to be more generally understood consistent with present principles that the merging/movement of different but related emails into a single message may include combining different senders and recipients of the merged messages themselves.

From block 508 the logic of FIG. 5 may next proceed to block 510. At block 510 in some examples the device may, responsive to moving content from the first and second emails into the third (different) email, remove the first and second emails from the inbox of the electronic messaging account at which the first and second emails were received. Or if the content of one of the first and second emails was moved into the other of the two emails, the one that had its content moved into the other may be removed from the inbox while the one that had content added from the other may remain in the inbox. Further note that in either case, responsive to removing the relevant email or other message from the inbox, the device may either save/move the removed message to another folder for the same messaging account (e.g., a dedicated merged messages folder) or may delete the relevant message from the messaging account altogether.

From bock 510 the logic may proceed to block 512 in some examples where, if an ANN was used for determining whether the first and second emails are related, the ANN may be trained even further based on the outcome of the processing of the first and second emails and/or any user input possibly received to the prompt presented at block 508 or even user selection of an un-merge selector like the selector 406. The training may therefore include machine learning, including deep learning, with user indications of whether to merge, not merge, or unmerge emails/messages being used as labels for the training data (the messages themselves). Also as training data, emails and other messages that have already been autonomously merged and for which no command to un-merge has been received may be used (e.g., labeled as "merge").

Also note here that the machine learning itself may include supervised learning, unsupervised learning, semi-supervised learning, reinforcement learning, feature learning, self-learning, and other forms of learning. Thus, performing machine learning may involve accessing and then training a model like one of the ones described above using training data to then enable the model to process further data to make inferences in the future during deployment. And further note that an underlying neural network that is being trained may include an input layer, an output layer, and multiple hidden layers in between that that are configured and weighted to make inferences about an appropriate output, and so the layers/nodes may be altered or weighted differently as part of the training.

Still in reference to FIG. 5, after additional training at block 512, the logic may proceed back to block 500 to proceed again therefrom to parse and possibly merge additional emails or other electronic messages that are identified, such as other electronic messages that might be subsequently sent by the same end-user user or received by that end user through their personal messaging account. For example, a fourth electronic message may be identified that might have the same subject line as the first, second, and even third electronic messages but, based on content of the fourth electronic message, the device may decline to include content from the fourth electronic message in the third electronic message or whatever operative electronic message has incorporated the content of past messages into it.

Figure 6:
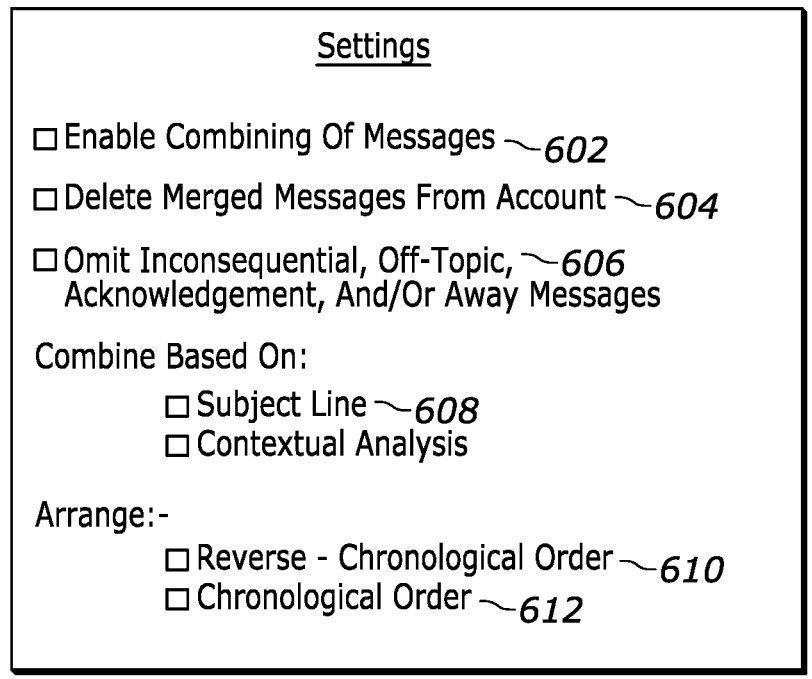
FIG. 6 shows an example graphical user interface (GUI) that may be presented on a display to configure one or more settings of a device/system to operate consistent with present principles.

Continuing the detailed description in reference to FIG. 6, it shows an example settings graphical user interface (GUI) 600 that may be presented on a display of a client device or even display of a server to configure one or more settings of an email/messaging system, service, account, or software consistent with present principles. For example, the GUI 600 may be presented on a display of the device undertaking the logic of FIG. 5, a display of an end-user's own client device, and/or the display of a system administrator's device. The settings GUI 600 may be presented to set or enable one or more settings of the device or conferencing system to operate consistent with present principles and may be reached by navigating a messaging app menu or a settings menu of a messaging application used consistent with present principles. Also note that in the example shown, each option discussed below may be selected by directing touch or cursor input to the respective check box adjacent to the respective option.

Accordingly, as shown in FIG. 6, the GUI 600 may include an option 602 that may be selectable a single time to set or configure the device, system, software, etc. to undertake present principles for the combining of messages for respective multiple future different message threads that the end-user might be on. For example, the option 602 may be selected to configure a messaging account or client device to execute the functions described above in reference to FIGS. 3 and 4 and execute the logic of FIG. 5 for multiple different message threads/chains.

The GUI 600 may also include an option 604 that may be selected to set or enable the device to delete messages that have had their content moved into other messages as described above. Additionally, if desired the GUI 600 may include an option 606 that may be selectable to set or enable the device to decline to combine messages that might have the same subject line or otherwise be related but that are also inferred as being inconsequential (e.g., based on keyword recognition), as being off-topic (e.g., based on contextual analysis/topic segmentation), as being a mere acknowledgement of a past message (e.g., based on keyword recognition such as simply indicating the phrase "okay"), and/or as being an auto-generated, standardized away message that a recipient's messaging account may be configured to send in response to any email sent to the messaging account while away messaging is enabled.

As also shown in FIG. 6, the GUI 600 may include various respective options 608 to select use of one or more rules or other ways of determining whether messages should be combined into a single message consistent with present principles. Thus, while only two respective options 608 are presented for using a same subject line and contextual analysis, any of the criteria/rules/ways discussed herein may be listed as a respective option 608.

Also if desired, the GUI 600 may include an option 610 that may be selected to configure the device to combine messages top to bottom into a single message in reverse-chronological order based on sent/receipt time, as well as an option 612 to instead configure the device to combine messages top to bottom in chronological order.

It may now be appreciated that present principles provide for an improved computer-based user interface that increases the functionality and ease of use of the devices disclosed herein. For example, the disclosed concepts provide easier digital management of electronic messages, an increase of available storage space that can then be used for storing other data, and a less voluminous amount of message data for which digital security resources are to be dedicated (thus conserving RAM, power, and processor resources). The disclosed concepts are therefore rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor; and
   storage accessible to the at least one processor and comprising instructions executable by the at least one processor to:
   identify a first email;
   identify a second email different from the first email;
   determine that the first and second emails are related;
   responsive to the determination, move content from one or more of the first and second emails into a third email; and
   present a prompt based on a fourth email being inferred as an inconsequential email, the prompt asking whether a user wants to move content from the fourth email into the third email, the prompt comprising a selector that is selectable to provide a command to move the content from the fourth email into the third email, wherein the fourth email is inferred as an inconsequential email based on one or more of: keyword recognition, the fourth email being off-topic as determined from topic segmentation, the fourth email being an acknowledgement of a past message, and/or the fourth email being an auto-generated away message that a recipient's messaging account has been configured to send in response to emails sent to the messaging account while away messaging is enabled.

2. The device of claim 1, wherein the fourth email is inferred as an inconsequential email based on keyword recognition.

3. The device of claim 1, wherein the fourth email is inferred as an inconsequential email based on the fourth email being off-topic as determined from topic segmentation.

4. The device of claim 1, wherein the fourth email is inferred as an inconsequential email based on the fourth email being an acknowledgement of a past message.

5. The device of claim 1, wherein the fourth email is inferred as an inconsequential email based on the fourth email being an auto-generated away message that a recipient's messaging account has been configured to send in response to emails sent to the messaging account while away messaging is enabled.

6. The device of claim 1, wherein the third email is the second email, and wherein the instructions are executable to move content from the first email into the second email.

7. The device of claim 1, wherein the third email is different from the first and second emails.

8. The device of claim 7, wherein the third email is a reply to one of the first and second emails.

9. The device of claim 1, wherein the instructions are executable to:
   determine that the first and second emails are related based on at least some same content being included in both the first and second emails.

10. The device of claim 1, wherein the instructions are executable to:
    determine that the first and second emails are related based on one or more of: at least one sender being common to the first and second emails, at least one recipient being common to the first and second emails.

11. A method, comprising:
    identifying a first electronic message;
    identifying a second electronic message different from the first electronic message;
    determining that the first and second electronic messages are related;
    responsive to the determining, moving content from one or more of the first and second electronic messages into a third electronic message; and
    presenting a prompt based on a fourth electronic message being inferred as an inconsequential electronic message, the prompt asking whether a user wants to move content from the fourth electronic message into the third electronic message, the prompt comprising a selector that is selectable to provide a command to move the content from the fourth electronic message into the third electronic message, wherein the fourth electronic message is inferred as an inconsequential electronic message based on one or more of: keyword recognition, the fourth electronic message being off-topic as determined from topic segmentation, the fourth electronic message being an acknowledgement of a past message, and/or the fourth electronic message being an auto-generated away message that a recipient's messaging account has been configured to send in response to electronic messages sent to the messaging account while away messaging is enabled.

12. The method of claim 11, wherein the fourth electronic message is inferred as an inconsequential electronic message based on keyword recognition.

13. The method of claim 11, wherein the fourth electronic message is inferred as an inconsequential electronic message based on the fourth electronic message being off-topic as determined from topic segmentation.

14. The method of claim 11, wherein the fourth electronic message is inferred as an inconsequential electronic message based on the fourth electronic message being an acknowledgement of a past message.

15. The method of claim 11, wherein the fourth electronic message is inferred as an inconsequential electronic message based on the fourth electronic message being an auto-generated away message that a recipient's messaging account has been configured to send in response to electronic messages sent to the messaging account while away messaging is enabled.

16. At least one computer readable storage medium (CRSM) that is not a transitory signal, the at least one computer readable storage medium comprising instructions executable by at least one processor to:
    identify a first electronic message;
    identify a second electronic message different from the first electronic message;
    determine that the first and second electronic messages are related;
    based on the determination, move content from one or more of the first and second electronic messages into a third electronic message; and
    present a prompt based on a fourth electronic message being inferred as an inconsequential electronic message, the prompt asking whether a user wants to move content from the fourth electronic message into the third electronic message, the prompt comprising a selector that is selectable to provide a command to move the content from the fourth electronic message into the third electronic message, wherein the fourth electronic message is inferred as an inconsequential electronic message based on one or more of: keyword recognition, the fourth electronic message being off-topic as determined from topic segmentation, the fourth electronic message being an acknowledgement of a past message, and/or the fourth electronic message being an auto-generated away message that a recipient's messaging account has been configured to send in response to electronic messages sent to the messaging account while away messaging is enabled.

17. The CRSM of claim 16, wherein the fourth electronic message is inferred as an inconsequential electronic message based on keyword recognition.

18. The CRSM of claim 16, wherein the fourth electronic message is inferred as an inconsequential electronic message based on the fourth electronic message being off-topic as determined from topic segmentation.

19. The CRSM of claim 16, wherein the fourth electronic message is inferred as an inconsequential electronic message based on the fourth electronic message being an acknowledgement of a past message.

20. The CRSM of claim 16, wherein the fourth electronic message is inferred as an inconsequential electronic message based on the fourth electronic message being an auto-generated away message that a recipient's messaging account has been configured to send in response to electronic messages sent to the messaging account while away messaging is enabled.

* * * * *